3,812,015
DETERMINATION OF ORNITHINE-CARBAMYL-TRANSFERASE
Roger Prost, Versailles, France, assignor to Lucien International, Colombes, France
No Drawing. Filed Feb. 9, 1973, Ser. No. 331,125
Claims priority, application France, Feb. 29, 1972, 7206918
Int. Cl. G01n 31/14
U.S. Cl. 195—103.5 R                   8 Claims

ABSTRACT OF THE DISCLOSURE

The level of ornithine-carbamyl-transferase in serum is determined by reaction with a composition containing sufficient ethylenediaminetetraacetate buffer that a pH of 7.7 is produced on dilution to a concentration of 0.2 M; dilithium carbamyl phosphate; L-ornithine hydrochloride; and urease in an amount at least equivalent to the urea in the serum but less than that which would produce an ornithine-carbamyl-transferase activity of 2 mIU/ml. under the conditions of the analysis. The citrulline so produced is then determined colorimetrically by adding trichloroacetic acid and then reacting with diacetyl monoxime and thiosemicarbazide. As a control, an identical sample of serum is reacted with a composition which does not contain the L-ornithine hydrochloride but which is otherwise identical.

---

The present invention relates to a diagnostic reagent, to a two-part pack comprising said reagent and a control reagent and to the use of the diagnostic reagent and the control reagent in the determination of the level of ornithine-carbamyl-transferase (O.C.T.) in serum.

The determination of the O.C.T. level in serum is of considerable interest in the detection of hepatic disorders and in tracing recovery from these disorders, since the O.C.T. level begins to rise even before the onset of clinical symptoms and returns to normal only after recovery.

Unfortunately, the methods which are currently used for the determination of the O.C.T. level in serum take a long time to carry out and are rather difficult; moreover, they are insufficiently precise and reproducible. A new method has recently been proposed by K. Lorentz and W. Wrabetz in Z. Klin. Chem. u. Klin, Biochem., 1971, 3, 220–223.

The method of Lorentz and Wrabetz relies on the fact that, in the presence of serum ornithine-carbamyl-transferase, the reaction:

ornithine+carbamyl phosphate⇌citrulline+phosphate tends to proceed to the right. A known quantity of serum is, therefore, incubated with appropriate amounts of ornithine and of lithium carbamyl phosphate and the citrulline formed is determined by the coloration it, like all ureides, produces when reacted with diacetyl monoxime in an acid medium.

Serum, however, contains urea, which results in a coloration which is substantially greater than that produced by the citrulline. It is therefore necessary to add a substantial quantity of urease to the incubation medium to destroy the urea in the serum.

I have now discovered, however, that all commercial forms of urease have an intrinsic O.C.T. activity which varies depending upon the origin and quality of the urease. Such O.C.T. activity will, naturally, interfere with the results of the determination of the O.C.T. level of serum by the method of Lorentz and Wrabetz. We have, therefore, found that, if the method of Lorentz and Wrabetz is to be used in practice, this additional O.C.T. activity from the urease must be eliminated or, at least, quantified.

It is, therefore, an object of the present invention to provide a modified Lorentz and Wrabetz method for the determination of the O.C.T. level of serum, in which the amount of urease used is so adjusted as to introduce a negligible O.C.T. activity compared with the O.C.T. activity of normal serum. Since the O.C.T. activity of normal serum amounts to no more than 10 mIU/ml., the quantity of urease employed should be such that the error in the O.C.T. determination introduced by it does not exceed 2 mIU/ml. under the conditions of analysis. On the other hand, the amount of urease should be sufficient to ensure the destruction of the urea present in the serum, serum normally containing at most 2 grams per litre of urea.

Another disadvantage of the method of Lorentz and Wrabetz is that the solution of reactants employed is unstable at the necessary pH (pH 7.7±0.1). In particular, dilithium carbamyl phosphate will not last more than 4 hours at this pH and at a temperature of 0° C. I have also surprisingly discovered that the reagents used in the determination of the level of O.C.T. activity in serum will remain stable, even if in admixture, provided that the reagent composition is maintained in a dry condition. It is, therefore, a further object of the invention to provide a dry diagnostic reagent composition comprising an ethylenediaminetetraacetate (EDTA) buffer, dilithium carbamyl phosphate, L-ornithine hydrochloride and urease, which will remain stable for at least 6 months. A still further object of the invention is to provide a dry reagent composition, for use as a control, which is identical with the aforesaid diagnostic reagent composition but which does not contain the L-ornithine hydrochloride.

A still further object of the invention is to provide a two-part pack containing, in one part, the diagnostic reagent composition and, in the other part, the control reagent composition.

Other objects and advantages of the invention will appear as the description proceeds.

Thus, in one aspect, the present invention provides a diagnostic reagent composition for the determination of the ornithinecarbamyl-transferase activity of serum, which composition comprises:

(a) A dry buffer consisting of a mixture of disodium ethylenediaminetetraacetate and tetrasodium ethylenediaminetetraacetate in such a ratio that a 0.2 M aqueous solution of said mixture has a pH of about 7.7;
(b) Dilithium carbamyl phosphate;
(c) L-ornithine hydrochloride, the molar ratio of (b):(c) being about 1:0.6; and
(d) Urease in an amount at least equivalent to the amount of urea in the serum to be tested and less than the amount which produces an ornithine-carbamyl-transferase activity of 2 mIU/ml. under analysis conditions.

The invention also provides a control reagent composition, for use in association with the diagnostic reagent composition for the determination of the ornithine-carbamyl-transferase activity of serum, the control reagent composition containing the same components in the same amounts as the diagnostic reagent composition, but omitting the L-ornithine hydrochloride.

The invention further provides a method of determining the ornithine-carbamyl-transferase activity of serum, which comprises:

(i) Preparing a diagnostic reagent composition by mixing the components described above;

(ii) Preparing a control reagent composition by mixing the components listed above;

(iii) Adding identical volumes of water to said diagnostic reagent composition and said control reagent composition to form solutions of said compositions;

(iv) Incubating said solutions with identical volumes of serum;

(v) Adding trichloroacetic acid to the incubated solutions;

(vi) Separating the supernatant liquors from the solutions; and (vii) Determining colorimetrically the citrulline formed by the incubation by reacting the supernatant liquors with diacetyl monoxime and thiosemicarbazide in a strongly acid medium and comparing the optical densities of the liquors produced from the diagnostic reagent composition and the control reagent composition with a standard solution of known ornithine-carbamyl-transferase activity.

In the preparation of the diagnostic reagent composition and the control reagent composition, all ingredients of these compositions are very carefully desiccated at low temperature, to ensure that they are dry. The production of these compositions is carried out essentially in two stages.

In a first stage, a dry buffer mixture is produced by mixing disodium EDTA with tetrasodium EDTA in proportions which have been experimentally determined so that, after dissolving the mixture in the volume of water required to give an overall molar concentration of 0.2 M, a pH of $7.7 \pm 0.1$ is obtained. Thus, in practice, the calculated proportions of the two salts are first mixed dry and a sample of the mixture is taken, dissolved in water to a concentration of 0.2 M and the pH value of the solution is determined. Depending upon the pH of this sample solution, the relative proportions of the two salts in the mixture are adjusted until a 0.2 M solution of a sample has the required pH value of $7.7 \pm 0.1$. The mixture of the two salts is then desiccated with phosphoric anhydride under a vacuum.

The EDTA buffer mixture may, for example, contain 5.06 grams (0.0135 mol) of disodium EDTA dihydrate (molecular weight 372.24) and 2.68 grams (0.0064 mol) of tetrasodium EDTA dihydrate (molecular weight 416.21). Dissolution of this mixture (i.e. a total of 0.0199 mol) in sufficient water to produce 100 ml. of buffer solution gives a solution having a concentration of approximately 0.2 mol per litre and a pH value which may be shown experimentally to be 7.7.

In a second stage the diagnostic reagent composition and the control reagent composition are prepared by adding to the desired quantity of the previously produced dry buffer mixture the required proportions of dilithium carbamyl phosphate, urease in the amount specified above and, in the case of the diagnostic reagent composition, L-ornithine hydrochloride.

The various components of the reagent compositions are weighed to within 5% and the diagnostic reagent composition and the control reagent composition are finally made up into unit dosage form in tubes after weighing to within 1 mg. for 25 mg., in a dry atmosphere with a continuous supply of nitrogen. An example of each of the two compositions is as follows, tube $A_1$ being the diagnostic reagent composition and tube $B_1$ being the control reagent composition.

| Tube | Milligrams | |
|---|---|---|
| | $A_1$ | $B_1$ |
| Buffer (3.70 g. disodium EDTA per 4.16 g. tetrasodium EDTA) | 23.6 | 23.6 |
| Urease (very pure analysis quality) | 0.2 | 0.2 |
| Dilithium carbamyl phosphate | 1.4 | 1.4 |
| L-ornithine hydrochloride | 1.0 | 0.0 |
| Total | 26.2 | 25.2 |

Prior to incubation, 0.3 ml. of water and 0.2 ml. of the serum whose O.C.T. level is to be determined are added to each of these tubes.

The two reagent compositions of the invention are thus employed as incubation substrata for the determination of the level of ornithine-carbamyl-transferase in the serum by the method which essentially consists of the following stages:

(1) Incubation.—The required quantity of the diagnosis reagent composition of the invention diluted in a given volume of water, together with a volume of serum to be analyzed, and a corresponding quantity of the control reagent composition (which is made up in the same way as the diagnosis reagent composition, except that no L-ornithine hydrochloride is included), diluted with an identical volume of water and mixed with the same volume of serum, are incubated in two separate haemolysis tubes in a jacketed boiler at 37° C. for 20 minutes.

Identical volumes of a 20% aqueous solution of trichloroacetic acid are then added to each tube and, after allowing the mixture to rest for 2–3 minutes, the mixtures are centrifuged and the supernatant liquors are collected.

(2) Coloration.—To the supernatant liquors from each of the tubes are added identical volumes of an acid reagent consisting of a dilute solution of phosphoric and sulphuric acids containing ferric ions as catalyst, and of a coloring reagent consisting of a solution of diacetyl monoxime and thiosemicarbazide. For comparison, a standard tube is prepared containing the 20% trichloroacetic acid, the acid reagent and the coloring agent, together with a standard solution containing a known quantity of citrulline (or of urea) which has a known O.C.T. activity. For example, the standard solution may be a standard urea solution containing 40 grams per litre of urea in distilled water, stabilized by the addition of 0.004 grams per litre of mercuric iodide, and diluted by 20 volumes. Under the conditions of the analysis, this corresponds to an O.C.T. activity 31 mIU/ml. This standard solution has the advantage that it may equally well be employed, without prior dilution, for the determination of urea.

(3) Measurement and calculation.—After the tubes have been kept in a jacketed boiler for a few minutes, the optical density of each of the three tubes is determined at 530 nm. by comparison with a "reagents" control tube containing only the trichloroacetic acid, the acid reagent and the coloring reagent. The O.C.T. activity of the serum is then calculated from the known activity of the standard solution. If the standard solution described above is used, the O.C.T. activity may be calculated from the following equation:

$$\text{O.C.T. activity (mIU/ml.)} = \frac{O.D._A - O.D._B}{O.D._S} \times 31$$

where:

$O.D._A$ = optical density of the solution prepared from the diagnosis reagent composition;

$O.D._B$ = optical density of solution prepared from control reagent composition; and $O.D._S$ = optical density of standard solution.

Using the contents of tubes $A_1$ and $B_1$, whose compositions are given above, the O.C.T. activity may be determined by the following procedure.

(a) Incubation.—The contents of tubes $A_1$ and $B_1$ are separately mixed with 0.3 ml. of water and 0.2 ml. of serum. The solutions are then kept in a jacketed vessel at 37° C. for precisely 20 minutes. 0.5 ml. of a 20% aqueous solution of trichloroacetic acid is then added to each of the two solutions. After mixing, the mixtures are left to stand for 2–3 minutes and are then centrifuged for 3–4 minutes at about 4,000 r.p.m. and the supernatant liquors are separated.

(b) Coloration.—The following solutions are prepared:

|  | Milliliters | | | |
|---|---|---|---|---|
|  | "Diagnosis" | "Control" | "Standard" | "Reagents" |
| Supernatant liquor | 0.4 | 0.4 | | |
| Standard urea solution (diluted 1/50th) | | | 0.2 | |
| Water | | | | 0.2 |
| 20% aqueous CCl₃COOH | | | 0.2 | 0.2 |
| Acid reagent | 2 | 2 | 2 | 2 |
| Coloring reagent | 0.5 | 0.5 | 0.5 | 0.5 |

After mixing, the mixtures are maintained in a boiling jacketed vessel for 8 minutes. They are then cooled and the optical density at 530 nm. of each of the "diagnosis," "control," and "standard" tubes is determined by comparison with the "reagent" tube. The O.C.T. activity of the serum is then calculated by means of the formula given above.

I claim:

1. A diagnostic reagent composition for the determination of the ornithine-carbamyl-transferase activity of serum, which composition comprises:
   (a) a dry buffer consisting of a mixture of disodium ethylenediaminetetraacetate and tetrasodium ethylenediaminetetraacetate in such a ratio that a 0.2 M aqueous solution of said mixture has a pH of about 7.7;
   (b) dilithium carbamyl phosphate;
   (c) L-ornithine hydrochloride, the molar ratio of (b):(c) being about 1:0.6; and
   (d) urease in an amount at least equivalent to the amount of urea in the serum to be tested and less than the amount which produces an ornithine-carbamyl transferase activity of 2 mIU/ml.

2. A diagnostic reagent composition as claimed in claim 1, in unit dosage form, wherein each dose contains: 23 mg. of a buffer consisting of a mixture of disodium ethylenediaminetetraacetate dihydrate and tetrasodium ethylenediaminetetraacetate dihydrate in a weight ratio of 3.70:4.16; 0.2 gram of analysis grade urease; 1.4 mg. of dilithium carbamyl phosphate; and 1 mg. of L-ornithine hydrochloride.

3. A control reagent composition, which comprises:
   (a) a dry buffer consisting of a mixture of disodium ethylenediaminetetraacetate and tetrasodium ethylenediaminetetraacetate in such a ratio that a 0.2 M aqueous solution of said mixture has a pH of about 7.7;
   (b) dilithium carbamyl phosphate; and
   (c) urease in an amount at least equivalent to the amount of urea in the serum to be tested and less than the amount which produces an ornithine-carbamyl-transferase activity of 2 mIU/ml.

4. A control reagent composition as claimed in claim 3, in unit dosage form, wherein each dose contains: 23.6 mg. of a buffer consisting of a mixture of disodium ethylenediaminetetraacetate dihydrate and tetrasodium ethylenediaminetetraacetate dihydrate in a weight ratio of 3.70:4.16; 0.2 gram of analysis grade urease; and 1.4 mg. of dilithium carbamyl phosphate.

5. A two-part pack, in which one part contains a diagnostic reagent composition for the determination of the ornithine-carbamyltransferase activity of serum, which composition comprises:
   (a) a dry buffer consisting of a mixture of disodium ethylenediaminetetraacetate and tetrasodium ethylenediaminetetraacetate in such a ratio that a 0.2 M aqueous solution of said mixture has a pH of about 7.7;
   (b) dilithium carbamyl phosphate;
   (c) L-ornithine hydrochloride, the molar ratio of (b):(c) being about 1:0.6; and
   (d) urease in an amount at least equivaltnt to the amount of urea in the serum to be tested and less than the amount which produces an ornithine-carbamyl-transferase activity of 2 mIU/ml. under the conditions of analysis;
and the other part contains a control reagent composition which comprises:
   (e) a dry buffer identical with the dry buffer in the diagnostic reagent composition;
   (f) an amount of dilithium carbamyl phosphate which is equal to the amount in the diagnostic reagent composition; and
   (g) an amount of urease equal to the amount in the diagnostic reagent composition.

6. A two-part pack as claimed in claim 5, wherein each composition contains: 23.6 mg. of a buffer consisting of disodium ethylenediaminetetraacetate dihydrate and tetrasodium ethylenediaminetetraacetate dihydrate in a weight ratio of 3.70:4.16; 0.2 gram of analysis grade urease; and 1.4 mg. of dilithium carbamyl phosphate; and wherein said diagnostic reagent composition additionally contains 1 mg. of L-ornithine hydrochloride.

7. A method of determining the ornithine-carbamyl-transferase activity of serum, which comprises:
   (i) preparing a diagnostic reagent composition by mixing:
      (a) a dry buffer consisting of a mixture of disodium ethylenediaminetetraacetate and tetrasodium ethylenediaminetetraacetate in such a ratio that a 0.2 M aqueous solution of said mixture has a pH of about 7.7;
      (b) dilithium carbamyl phosphate;
      (c) L-ornithine hydrochloride, the molar ratio of (b):(c) being about 1:0.6; and
      (d) urease in an amount at least equivalent to the amount of urea in the serum to be tested and less than the amount which produces an ornithine-carbamyl transferase activity of 2 mIU/ml. under the analysis conditions;
   (ii) preparing a control reagent composition by mixing:
      (e) a dry buffer identical with the dry buffer of said diagnostic reagent composition;
      (f) an amount of dilithium carbamyl phosphate equal to the amount in said diagnostic reagent composition; and
      (g) an amount of urease equal to that in said diagnostic reagent composition;
   (iii) adding identical volumes of water to said diagnostic reagent composition and said control reagent composition to form solutions of said compositions;
   (iv) incubating said solutions with identical volumes of serum;
   (v) adding trichloroacetic acid to the incubated solutions;
   (vi) separating the supernatant liquors from the solutions; and
   (vii) determining colorimetrically the citrulline formed by the incubation by reacting the supernatant liquors with diacetyl monoxime and thiosemicarbazide in a strongly acid medium and comparing the optical densities of the liquors produced from the diagnostic reagent composition and the control reagent composition with a standard solution of known ornithine-carbamyl-transferase activity.

8. A method as claimed in claim 7, wherein each of said diagnostic reagent composition and said control reagent composition contains: 23.6 mg. of a buffer consisting of disodium ethylenediaminetetraacetate dihydrate and tetrasodium ethylenediaminetetraacetate dihydrate in a weight ratio of 3.70:4.16; 0.2 gram of analysis grade urease; and 1.4 mg. of dilithium carbamyl phosphate; said diagnostic reagent composition additionally containing 1 mg. of L-ornithine hydrochloride and wherein 0.3 ml. of water is added to each of said reagent compositions to form diagnostic and control solutions, respectively, which are then incubated with 0.2 ml. of the serum to be analyzed, and wherein trichloroacetic acid is added to the incubated solutions and the citrulline formed is determined colorimetrically by the reaction of diacetyl monoxime and thiosemicarbazide in an acid medium on supernatant liquors from said solutions, the optical densities of the solutions thus obtained being measured and compared with the optical density of a standard solution having a known ornithine-carbamyl-transferase activity.

References Cited

Strandjord et al.: Journal of Laboratory and Clinical Medicine, vol. 67, pp. 154–170 (1966).

ALVIN E. TANENHOLTZ, Primary Examiner

U.S. Cl. X.R.

195—99